(12) United States Patent
Imes

(10) Patent No.: US 12,371,277 B2
(45) Date of Patent: Jul. 29, 2025

(54) ACCUMULATION DEVICE

(71) Applicant: ILLINOIS TOOL WORKS INC., Glenview, IL (US)

(72) Inventor: Douglas Alan Imes, Greer, SC (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 197 days.

(21) Appl. No.: 18/023,244

(22) PCT Filed: Sep. 1, 2021

(86) PCT No.: PCT/US2021/048604
§ 371 (c)(1),
(2) Date: Feb. 24, 2023

(87) PCT Pub. No.: WO2022/051328
PCT Pub. Date: Mar. 10, 2022

(65) Prior Publication Data
US 2023/0339699 A1    Oct. 26, 2023

Related U.S. Application Data

(60) Provisional application No. 63/073,127, filed on Sep. 1, 2020.

(51) Int. Cl.
*B65G 47/31*   (2006.01)
*B65G 23/26*   (2006.01)
(Continued)

(52) U.S. Cl.
CPC ............ *B65G 47/31* (2013.01); *B65G 23/26* (2013.01); *B65G 23/30* (2013.01); *B65G 43/08* (2013.01);
(Continued)

(58) Field of Classification Search
CPC ........ B65G 47/31; B65G 23/26; B65G 23/30; B65G 43/08; B65G 2203/0241;
(Continued)

(56) References Cited

U.S. PATENT DOCUMENTS

| 7,028,830 B2 * | 4/2006 | Beesley | B65G 47/5131 |
| | | | 198/594 |
| 2002/0125107 A1 * | 9/2002 | Horton | B65G 47/5131 |
| | | | 198/594 |

(Continued)

FOREIGN PATENT DOCUMENTS

KR    101686323 B1 * 12/2016

OTHER PUBLICATIONS

European Patent Office (EPO), Rijswijk, NL, International Search Report, Form PCT/ISA/210 for International Application No. PCT/US2021/048604, Dec. 20, 2021 (5 pp.).

(Continued)

*Primary Examiner* — Gene O Crawford
*Assistant Examiner* — Abby A Jorgensen
(74) *Attorney, Agent, or Firm* — Pauley Erickson & Swanson

(57) ABSTRACT

An accumulation device for placement within a stream of articles upstream of an independent article handling device, including an infeed conveyor for receiving articles and an outfeed conveyor for returning articles. A transfer device movable along the infeed conveyor and the outfeed conveyor is included. Each of an infeed drive and an outfeed drive drives the conveyors. A speed of the outfeed drive controlled at least in part by the independent article handling device; an infeed sensor for detecting an article flow rate upstream of the infeed conveyor and generating an infeed (Continued)

signal based on the article flow rate. A controller is included for controlling a speed of the infeed drive based at least in part on the infeed signal.

17 Claims, 4 Drawing Sheets

(51) Int. Cl.
*B65G 23/30* (2006.01)
*B65G 43/08* (2006.01)

(52) U.S. Cl.
CPC ............... *B65G 2203/0241* (2013.01); *B65G 2203/0291* (2013.01)

(58) Field of Classification Search
CPC .... B65G 2203/0291; B65G 2201/0244; B65G 47/5131
See application file for complete search history.

(56) References Cited

U.S. PATENT DOCUMENTS

| 2014/0014472 | A1* | 1/2014 | Ehmer | B65G 47/66 |
| | | | | 198/599 |
| 2016/0297618 | A1* | 10/2016 | Beesley | B65G 43/08 |
| 2016/0325943 | A1* | 11/2016 | Beesley | B65G 37/00 |
| 2016/0340129 | A1* | 11/2016 | Beesley | B65G 15/12 |
| 2024/0327134 | A1* | 10/2024 | Imes | B65G 47/766 |

OTHER PUBLICATIONS

European Patent Office (EPO), Rijswijk, NL, Written Opinion of the Int'l Searching Authority for Int'l Appln No. PCT/US2021/048604, Form PCT/ISA/237, Dec. 20, 2021 (7 pp.).

* cited by examiner

ACCUMULATION DEVICE

CROSS REFERENCE TO RELATED APPLICATION

This application is a National Phase filing of PCT International Patent Application PCT/US2021/048604, filed on 1 Sep. 2021, which claims the priority of U.S. Provisional U.S. Patent Application Ser. No. 63/073,127, filed 1 Sep. 2020.

These applications are hereby incorporated by reference herein in their entirety and is made a part hereof, including but not limited to those portions which specifically appear hereinafter.

BACKGROUND OF THE INVENTION

This invention relates generally to an accumulation device and, more particularly, to an accumulation device that can integrate with various third-party devices. Accumulation devices according to the current state of the art generally appear to be devices with two conveyor sections where the last conveyor of one zone integrates with the first conveyor of the next, subsequent zone. Such devices have infeed and outfeed drives that are part of a line control system with the same type and configuration of another conveyor drive. The operator controls are generally part of the line control system. The speed of the infeed and outfeed drives are programmed to follow the respective upstream or downstream speed of the machine. Accumulation or deaccumulation of objects on the conveyors would be a mechanical function of the difference of these two speeds.

Other accumulation devices, supplied as stand-alone machines, may have an infeed or outfeed speed worked off an internal value, which would sometimes present problems of incorrectly programmed values from signals from the respective conveyors. Such devices would advantageously deliver low-pressure accumulation for the devices, but showed shortcomings of a lack of improvement in the values of downstream machine infeed and higher speeds.

SUMMARY OF THE INVENTION

The invention generally relates to provide an improved accumulation device.

The general object of the invention can be attained, at least in part, through an accumulation device for placement within a stream of articles upstream of an independent article handling device. The accumulation device includes an infeed conveyor for receiving articles from the stream, an outfeed conveyor for returning articles to the stream toward the independent article handling device, and a transfer device movable along the infeed conveyor and the outfeed conveyor. The transfer device moves as a function of a speed of the infeed conveyor and a speed of the outfeed conveyor. The transfer device also transfers articles from the infeed conveyor to the outfeed conveyor. The accumulation device also includes an infeed drive for driving the infeed conveyor and an outfeed drive for driving the outfeed conveyor. A speed of the outfeed drive is controlled at least in part by the independent article handling device. An infeed sensor is also present for detecting an article flow rate upstream of the infeed conveyor and generating an infeed signal based on the article flow rate detected. A controller for controlling a speed of the infeed drive is present based at least in part on the infeed signal.

The prior art generally fails to allow third-party integrators to cooperate with current accumulation devices. The accumulation device of the present invention further includes a differential drive mechanism for moving the transfer device along the infeed conveyor and the outfeed conveyor based at least in part on an infeed input related to the speed of the infeed conveyor and an outfeed input related to the speed of the outfeed conveyor. The transfer device is movable between an empty position and a full position. The accumulating device includes a position sensor for generating a position signal when the transfer device nears the empty position.

The accumulation device also preferably includes a disconnect mechanism. The controller may cause the disconnect mechanism to selectively disengage the outfeed input without stopping the outfeed drive upon receipt of the position signal. The disconnect mechanism includes an intermediate drive where the controller may operate the intermediate drive so as to drive the outfeed input at a speed related to a speed of the outfeed conveyor when the position signal has not been received. The controller stops the intermediate drive upon receipt of the position signal. The disconnect mechanism of the present invention also includes a clutch where the controller causes a transmission of rotation via the clutch from a shaft rotating at a speed related to a speed of the outfeed conveyor to the outfeed input when the position signal has not been received. The controller precludes the transmission upon receipt of the position signal. The differential drive mechanism includes a gearing mechanism driven by the infeed input and the outfeed input. The invention also includes a transfer loop connected to the transfer device and driven by an output of the gearing mechanism. The infeed input is located within and is rotatable with the infeed conveyor and the outfeed input is located within and is rotatable with the outfeed conveyer.

The present invention also preferably includes an accumulation device for placement within a stream of articles upstream of an independent article handling device. The accumulation device includes an infeed conveyor for receiving articles from the stream, an outfeed conveyor for returning articles to the stream toward the independent article handling device, a transfer device for transferring articles from the infeed conveyor to the outfeed conveyor, an infeed drive for driving the infeed conveyor, an outfeed drive for driving the outfeed conveyor, an infeed sensor for detecting an article flow rate upstream of the infeed conveyor and generating an infeed signal based on the article flow rate detected, a controller for controlling a speed of the infeed drive based at least in part on the infeed signal, a differential drive mechanism for moving the transfer device along the infeed conveyor and the outfeed conveyor, where the transfer device has an infeed input related to the speed of the infeed conveyor and an outfeed input related to the speed of the outfeed conveyor, and a disconnect mechanism, where the controller causes the disconnect mechanism to selectively disengage the outfeed input without stopping the outfeed drive. Here, the transfer device is movable between an empty position and a full position.

Other objects and advantages will be apparent to those skilled in the art from the following detailed description taken in conjunction with the appended claims and drawings.

DETAILED DESCRIPTION OF THE INVENTION

Figure 2:
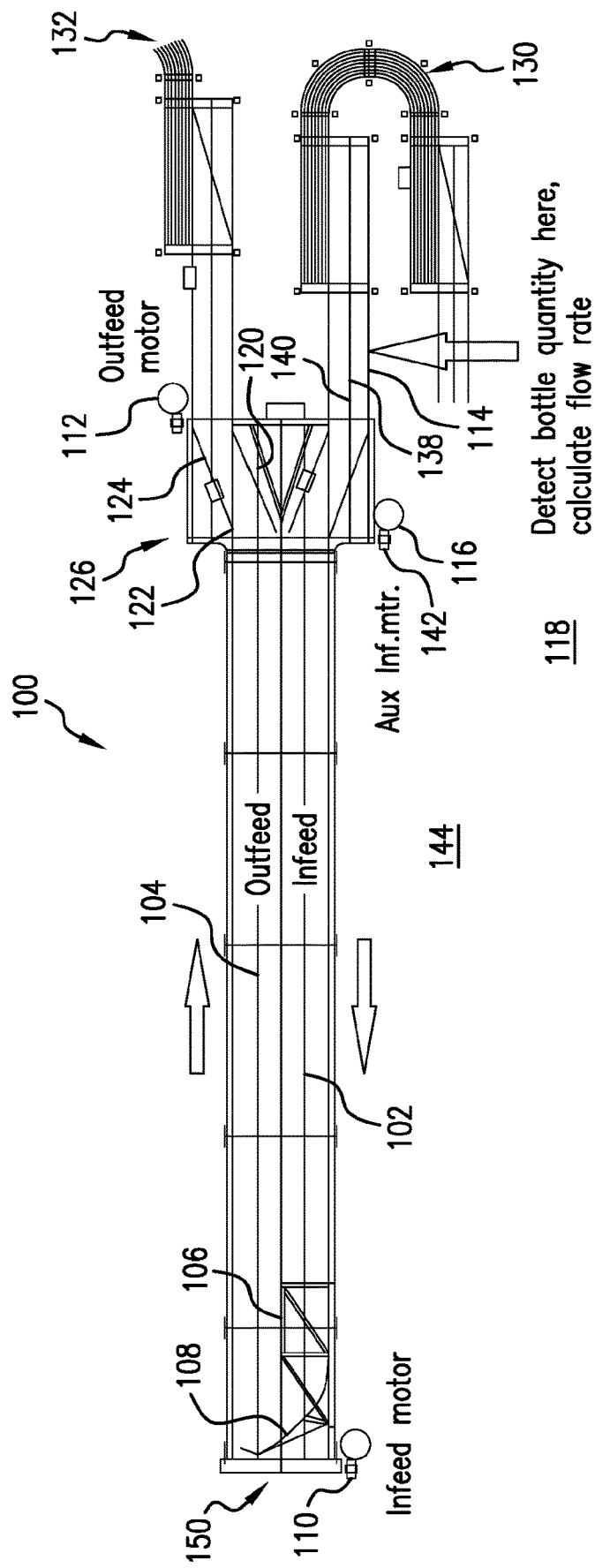
FIG. 2 is a schematic view of an accumulation device according to a preferred embodiment of this invention.

The present invention provides an accumulation device 100 for placement within a stream of articles upstream of an independent article handling device, or third-party machine. As shown in FIG. 2, the accumulation device 100 includes an infeed conveyor 102 for receiving articles 106 from the stream, an outfeed conveyor 104 for returning articles 106 to the stream toward the independent article handling device 200 (shown in FIG. 3), and a transfer device 108 movable along the infeed conveyor 102 and the outfeed conveyor 104. The infeed employs a distance measuring device to measure a quantity of bottles or other objects/articles flowing on a conveyor.

Figure 1:
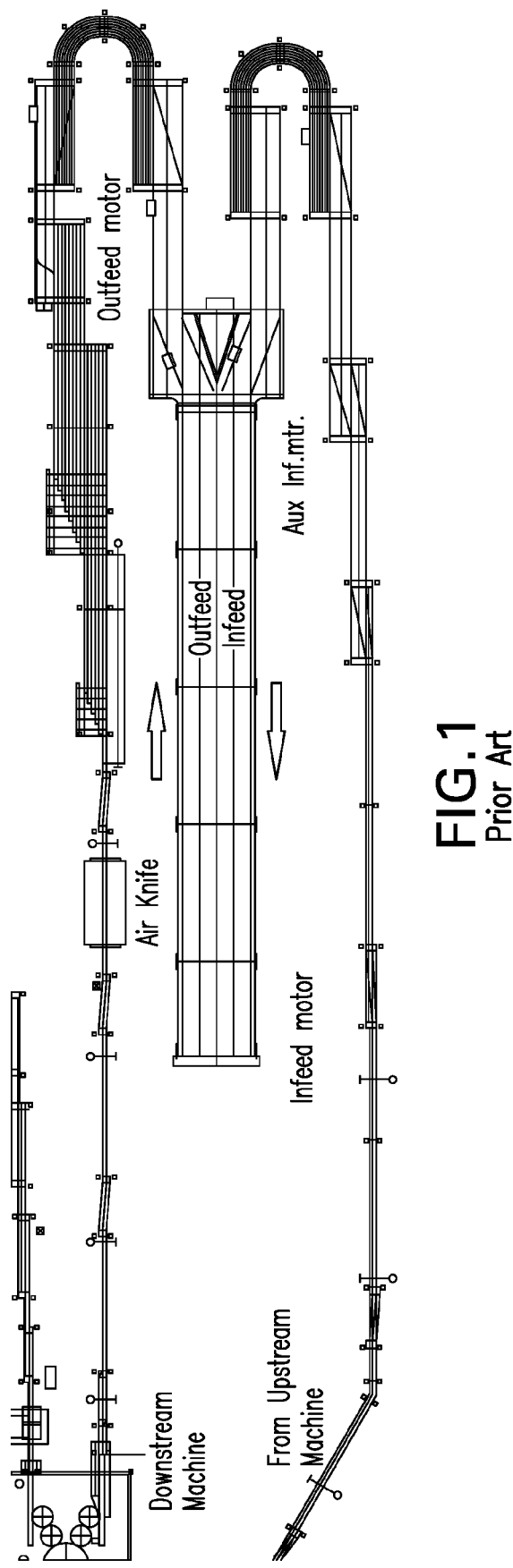
FIG. 1 is a schematic view of an accumulation device.

The transfer device 108 moves as a function of a speed of the infeed conveyor 102 and a speed of the outfeed conveyor 104. The speed of the device may be measured in Bottles Per Minute (BPM). While bottles are used in the claimed invention, it is to be understood that the conveyors may adapt for a variety of objects capable of being moved on the accumulation device 100. As such, the speed of the infeed and/or outfeed conveyors may be appropriately altered to coincide with the type of object being moved. Alternative speeds may further include being measured as a function of distance of the conveyors as opposed to object quantity, such as in Feet Per Minute (FPM). The accumulation device 100 of the claimed invention further employs being able to integrate speed of a conveyor (regardless of how speed in calculated) to work in conjunction with third-party additives or additional machines. As shown in FIG. 1, this typically starts with an object flow, from left to right, along a bottom conveyor, into the infeed, out of the outfeed, to a single filer, and finally to a separate machine, or "third-party" independent article handling device.

In order to calculate a flow rate of articles 106 in the claimed invention, the infeed conveyor 102 is used. This is opposed to requiring a signal from upstream machinery to determine flow rate. The transfer device 108 also transfers articles 106 from the infeed conveyor 102 to the outfeed conveyor 104. The accumulation device 100 also includes an infeed drive 110 for driving the infeed conveyor 102 and an outfeed drive 112 for driving the outfeed conveyor 104. A speed of the outfeed drive 112 is controlled at least in part by the independent article handling device 200. An infeed sensor 114 is also present for detecting an article flow rate upstream of the infeed conveyor 102 and generating an infeed signal 118 based on the article flow rate detected. A controller 116 for controlling a speed of the infeed drive 110 is present based at least in part on the infeed signal 118.

Figure 3:
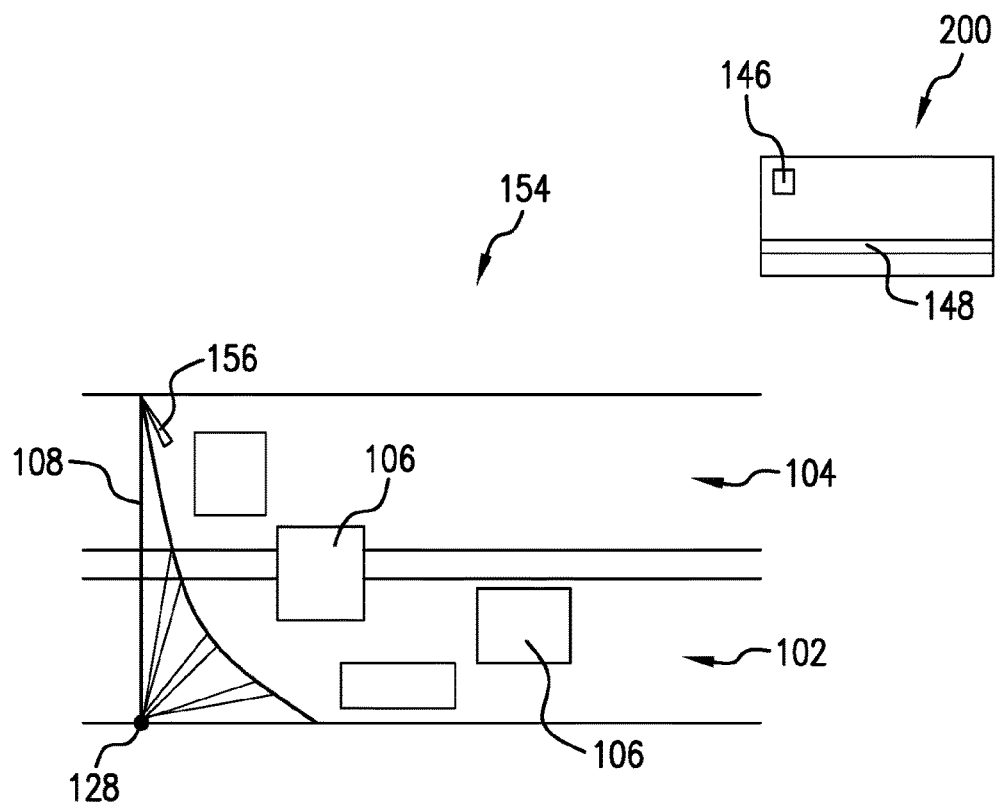
FIG. 3 is an enlarged schematic view of the accumulation device in a full position according to the embodiment of FIG. 2.
Figure 4:
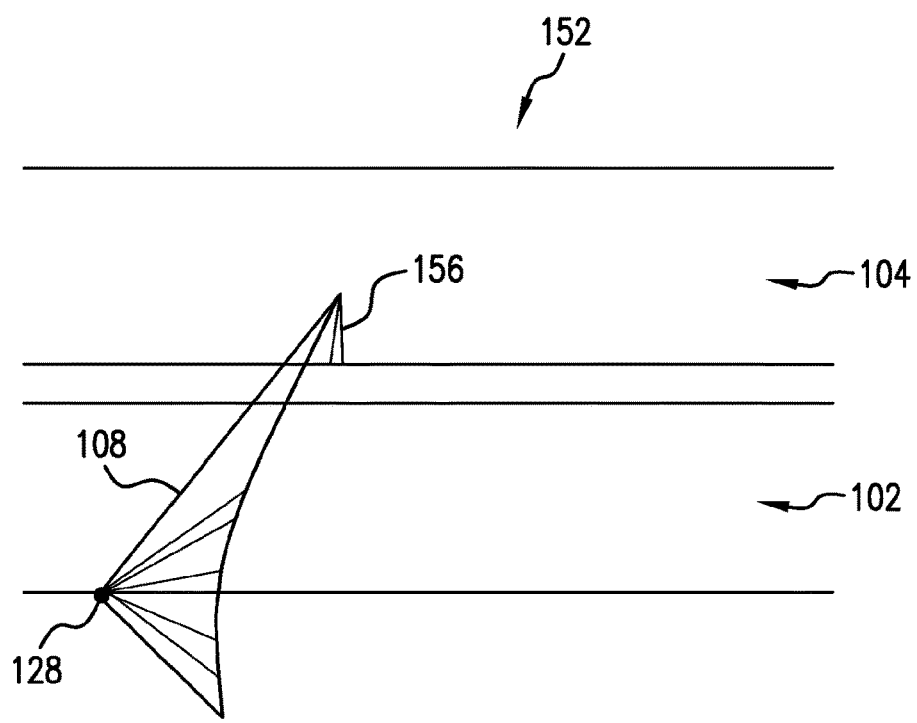
FIG. 4 is an enlarged schematic view of the accumulation device in an empty position according to the embodiment of FIG. 2.

The prior art generally fails to allow third-party integrators to deploy working with current accumulation devices. Using an outfeed speed in BPM from an upstream machine, the conveyors between the upstream machine and an accumulation device would run full, but loose. That is, the bottles would never accumulate in the device. The accumulation device 100 of the present invention further includes a differential drive mechanism 150 for moving the transfer device 108 along the infeed conveyor 102 and the outfeed conveyor 104 based at least in part on an infeed input related to the speed of the infeed conveyor 102 and an outfeed input related to the speed of the outfeed conveyor 104. The transfer device 108 is movable between an empty position 152 (as shown in FIG. 4) and a full position 154 (as shown in FIG. 3). The accumulating device includes a position sensor 156 for generating a position signal when the transfer device 108 nears the empty position 152. These features avoid tying the outfeed of the accumulation device to a third-party machines actual speed. Therefore, accumulation is able to take place on the conveyor of the claimed invention, as opposed to the prior art where an outfeed of a device would be tied to a downstream machine's actual speed in BPM, therefore bottles would never accumulate on the conveyor, which would cause a start and stop motion of the downstream process.

The accumulation device 100 of the claimed invention also includes a disconnect mechanism 126. The controller 116 may cause the disconnect mechanism 126 to selectively disengage the outfeed input without stopping the outfeed drive 112 upon receipt of the position signal. The disconnect mechanism 126 includes an intermediate drive 120 where the controller 116 may operate the intermediate drive 120 so as to drive the outfeed input at a speed related to a speed of the outfeed conveyor 104 when the position signal has not been received. The controller 116 stops the intermediate drive 120 upon receipt of the position signal.

As shown in FIG. 2, the infeed employs a distance measuring device to measure the quantity of bottles flowing on the infeed conveyor 102, and/or an auxiliary infeed conveyor 138. The auxiliary infeed conveyor 138 is upstream of the infeed conveyor 102. This calculates flow rate of the accumulation device 100, rather than needing to rely on getting a signal from upstream machinery. The motor of the accumulation device 100 pulls a chain at a measured flow rate. The flow rate may also include a correction factor to better maintain and adjust the flow rate. The correction factor is based on a modulation swing gate which may be located on the auxiliary infeed conveyor 138. The disconnect mechanism 126 of the present invention also includes a clutch 122 where the controller 116 causes a transmission of rotation via the clutch 122 from a shaft 124 rotating at a speed related to a speed of the outfeed conveyor 104 to the outfeed input when the position signal has not been received. In other embodiments, the disconnect mechanism may function without the use of a clutch. In such embodiments, an additional drive may be added to disengage the transfer device. The additional drive can control a motor downstream from the outfeed conveyor, therefore eliminating the need for a clutch to complete rotation. The controller 116 precludes the transmission upon receipt of the position signal. The differential drive mechanism 150 includes a gearing mechanism driven by the infeed input and the outfeed input. At a union of the auxiliary infeed conveyor 138 and the infeed conveyor 102, the infeed utilizes a prime switch. The switch provides maintenance so that the infeed will not run if bottles are not present. The invention also includes a transfer loop 128 connected to the transfer device 108 and driven by an output of the gearing mechanism. The infeed input is located within and is rotatable with the infeed conveyor 102 and the outfeed input is located within and is rotatable with the outfeed conveyer.

Figure 5:
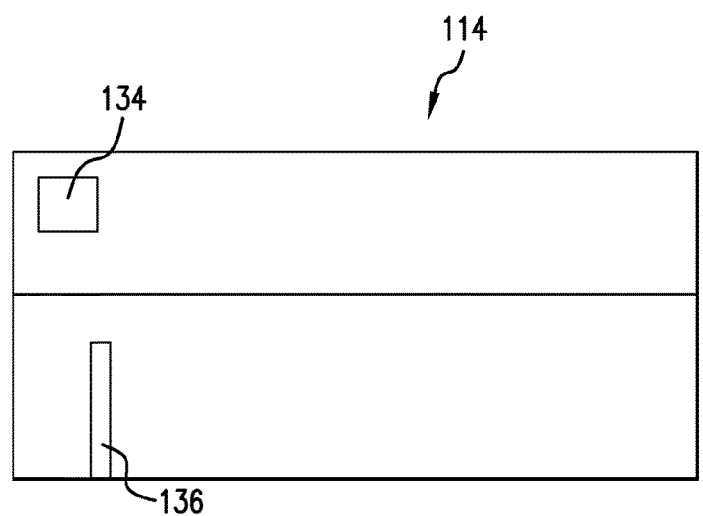
FIG. 5 is a schematic view of an infeed sensor for the accumulation device according to the embodiment of FIG. 2.

In addition, the infeed input is located external to, and is drivable, via a loop 130 rotatable with the infeed conveyor 102. The outfeed input is located external to, and is drivable, via a loop 132 rotatable with the outfeed conveyer. The infeed sensor 114 senses an article flow rate measured in articles per amount of time, for example, BPM. As shown in FIG. 5, the infeed sensor 114 includes an optical sensor 134 that senses a depth of articles 106 passing along a fixed member 136. The fixed member 136 is located along a lateral side 140 of the auxiliary infeed conveyor 138. A flow rate tuning sensor 142 is also present upstream of the infeed conveyor 102 and downstream of the infeed sensor 114 for generating a tuning signal 144 related to a flow rate of articles 106 passing the flow rate tuning sensor 142. The controller 116 controls the speed of the infeed drive 110 based at least in part on the tuning signal 144. The use of the distance measuring device, infeed motor and prime switch in the claimed invention results in a consistent infeed population for the accumulation device 100, regardless of the rate objects are arriving to the device from a third party. As such, objects can be brought to the accumulation device 100 from an accumulation conveyor in no particular form or order, or single file (or any other orderly fashion), and the accumulation device 100 will still populate the same, and without the need of integration signals.

Additionally, if/when the infeed sensor 114 of the accumulation device 100 senses an article flow rate of 0 for more than a predetermined period of time, the controller 116 stops the infeed drive 110. The speed of the outfeed drive 112 may be controlled directly by the independent article handling device 200 (or third party device). The speed of the outfeed drive 112 may also be controlled indirectly by the independent article handling device 200. In essence, the flexibility of the outfeed drive 112 makes the accumulation device 100 more adaptable to various third party devices as the motor of the outfeed can by controlled by a third party system. The accumulation device 100 of the present invention further includes an external speed sensor 146 for sensing a speed of a drive 148 within the independent article handling device 200 and for generating an external speed signal. Here, the controller 116 causes the outfeed drive 112 to operate at a speed based on the external speed signal. That is, the controller 116 may view the outfeed drive 112 as a first conveyor as a part of an independent system. The outfeed drive 112 can be controlled by a chosen motor logic—such as FPM, BPM. % hz, or any other desirable and suitable measurement. Articles 106 will uniformly populate so that the arrangement of the articles 106 will not disable the controller's strategy. This allows the accumulation device 100 to be coupled with the independent article handling device 200 without the use of downstream integration signals, bottle dimensions, object dimensions, or a recipe system.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An accumulation device for placement within a stream of articles upstream of an independent article handling device, the accumulation device comprising:
    an infeed conveyor for receiving articles from the stream;
    an outfeed conveyor for returning articles to the stream toward the independent article handling device;
    a transfer device movable along the infeed conveyor and the outfeed conveyor as a function of a speed of the infeed conveyor and a speed of the outfeed conveyor, the transfer device transferring articles from the infeed conveyor to the outfeed conveyor, wherein the transfer device is movable between an empty position and a full position, the accumulating device further including a position sensor for generating a position signal when the transfer device nears the empty position;
    an infeed drive for driving the infeed conveyor;
    an outfeed drive for driving the outfeed conveyor, a speed of the outfeed drive being controlled at least in part by the independent article handling device;
    an infeed sensor for detecting an article flow rate upstream of the infeed conveyor and generating an infeed signal based on the article flow rate detected, wherein the infeed sensor includes an optical sensor that senses a depth of articles passing along a fixed member;
    a controller for controlling a speed of the infeed drive based at least in part on the infeed signal;
    a differential drive mechanism for moving the transfer device along the infeed conveyor and the outfeed conveyor based at least in part on an infeed input related to the speed of the infeed conveyor and an outfeed input related to the speed of the outfeed conveyor; and
    a disconnect mechanism, the controller causing the disconnect mechanism to selectively disengage the outfeed input without stopping the outfeed drive upon receipt of the position signal.

2. The accumulation device of claim 1, wherein the disconnect mechanism includes an intermediate drive, the controller operating the intermediate drive so as to drive the outfeed input at a speed related to a speed of the outfeed conveyor when the position signal has not been received, the controller stopping the intermediate drive upon receipt of the position signal.

3. The accumulation device of claim 1, wherein the disconnect mechanism includes a clutch, the controller causing a transmission of rotation via the clutch from a shaft rotating at a speed related to a speed of the outfeed conveyor to the outfeed input when the position signal has not been received, the controller precluding the transmission upon receipt of the position signal.

4. The accumulation device of claim 1, wherein the differential drive mechanism includes a gearing mechanism driven by the infeed input and the outfeed input.

5. The accumulation device of claim 4, further including a transfer loop connected to the transfer device and driven by an output of the gearing mechanism.

6. The accumulation device of claim 1, wherein the infeed input is located within and is rotatable with the infeed conveyor, and wherein the outfeed input is located within and is rotatable with the outfeed conveyer.

7. The accumulation device of claim 1, wherein the infeed input is located external to and is drivable via a loop rotatable with the infeed conveyor, and wherein the outfeed input is located external to and is drivable via a loop rotatable with the outfeed conveyer.

8. The accumulation device of claim 1, wherein the infeed sensor senses an article flow rate measured in articles per amount of time.

9. The accumulation device of claim 1, further including an auxiliary infeed conveyor upstream of the infeed conveyor, the fixed member being located along a lateral side of the auxiliary infeed conveyor.

10. The accumulation device of claim 1, further including a flow rate tuning sensor located upstream of the infeed conveyor and downstream of the infeed sensor for generating a tuning signal related to a flow rate of articles passing the flow rate tuning sensor, the controller controlling the speed of the infeed drive based at least in part on the tuning signal.

11. The accumulation device of claim 1, wherein if the infeed sensor senses an article flow rate of 0 for more than a predetermined period of time, the controller stops the infeed drive.

12. The accumulation device of claim 1, wherein the speed of the outfeed drive is controlled directly by the independent article handling device.

13. The accumulation device of claim 1, wherein the speed of the outfeed drive is controlled indirectly by the independent article handling device.

14. The accumulation device of claim 13, further including an external speed sensor for sensing a speed of a drive within the independent article handling device and for generating an external speed signal, the controller causing the outfeed drive to operate at a speed based on the external speed signal.

15. An accumulation device for placement within a stream of articles upstream of an independent article handling device, the accumulation device comprising:
an infeed conveyor for receiving articles from the stream;
an outfeed conveyor for returning articles to the stream toward the independent article handling device;
a transfer device for transferring articles from the infeed conveyor to the outfeed conveyor;
an infeed drive for driving the infeed conveyor;
an outfeed drive for driving the outfeed conveyor;
an infeed sensor for detecting an article flow rate upstream of the infeed conveyor and generating an infeed signal based on the article flow rate detected, wherein the infeed sensor includes an optical sensor that senses a depth of articles passing along a fixed member;
a controller for controlling a speed of the infeed drive based at least in part on the infeed signal;
a differential drive mechanism for moving the transfer device along the infeed conveyor and the outfeed conveyor, the transfer device having an infeed input related to the speed of the infeed conveyor and an outfeed input related to the speed of the outfeed conveyor; and
a disconnect mechanism, the controller causing the disconnect mechanism to selectively disengage the outfeed input without stopping the outfeed drive, wherein the transfer device is movable between an empty position and a full position, the accumulating device further including a position sensor for generating a position signal when the transfer device nears the empty position, the controller causing the disconnect mechanism to selectively disengage the outfeed input upon receipt of the position signal.

16. The accumulation device of claim 15, wherein the disconnect mechanism includes an intermediate drive, the controller operating the intermediate drive so as to drive the outfeed input at a speed related to a speed of the outfeed conveyor when the position signal has not been received, the controller stopping the intermediate drive upon receipt of the position signal.

17. The accumulation device of claim 15, wherein the disconnect mechanism includes a clutch, the controller causing a transmission of rotation via the clutch from a shaft rotating at a speed related to a speed of the outfeed conveyor to the outfeed input when the position signal has not been received, the controller precluding the transmission upon receipt of the position signal.

* * * * *